Oct. 24, 1967 K. LEITNER 3,348,596
NUTS ESPECIALLY ADAPTED FOR THIN-WALL MOUNTING
Filed Feb. 23, 1965 3 Sheets-Sheet 1

*Inventor*
*Kajetan Leitner*
*By his Attorney*
*Carl E. Johnson.*

United States Patent Office 3,348,596
Patented Oct. 24, 1967

3,348,596
NUTS ESPECIALLY ADAPTED FOR THIN-WALL MOUNTING
Kajetan Leitner, 8939 Waal 187, Germany
Filed Feb. 23, 1965, Ser. No. 434,332
3 Claims. (Cl. 151—41.73)

ABSTRACT OF THE DISCLOSURE

A nut of the type commonly termed a blind collar nut or cut-in nut. The nut in its preferred embodiment has a conical shaped portion with its smaller diameter located at a collar base portion, which conical portion distends or deforms a preformed hole in a work piece as the nut is rotated approximately 90° to bring its base portion into abutting relation with the work piece.

---

This invention relates to fasteners, and more particularly to nuts having an external configuration enabling them to be mounted by partial insertion in a wall from one side thereof. It will be understood that the invention is not limited to the several embodiments disclosed herein by way of exemplification.

A principal object of this invention is to provde an economical means for securing parts, especially thin walled parts, together quickly and neatly. Another object of the invention is to provide an inexpensive nut mountable through a bore in a work piece as well as from the accessible side thereof. In accordance with these objects a feature of the invention resides in providing a self-locking nut having a base portion and a smaller, integral collar portion, the collar portion being adapted, upon insertion and rotation in a bore of a part to be coupled, to deform the wall of the bore and thus lock the base portion against the part. The nut, sometimes termed a cut-in or blind collar nut, is usually internally threaded to receive a bolt and comprises an elongated or generally oblong anchoring collar formed on the base. The collar preferably has one of several conical shapes to be described each of which has its smaller diameter at the collar base and which readily distend and/or deform the initially non-circular wall of a preformed hole in a work piece as the nut is turned about 90° and its base portion brought into abutting relation.

The foregoing and other novel features of the invention will now be described with greater particularity in connection with the illustrative embodiments, and with reference to the accompanying drawings thereof, in which.

Figure 9:
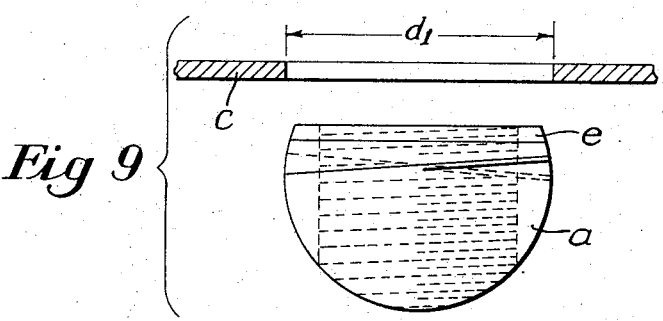
FIG. 9 is an end view of a collar nut having an upper collar band corresponding in thickness to that of the mounting work piece and a base formed with threads angularly related to the band, the minimum thread spacing from the band being less than the thickness of the work piece.
Figure 10:
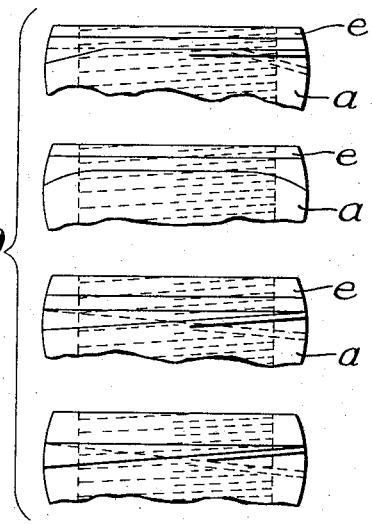
Figure 11:
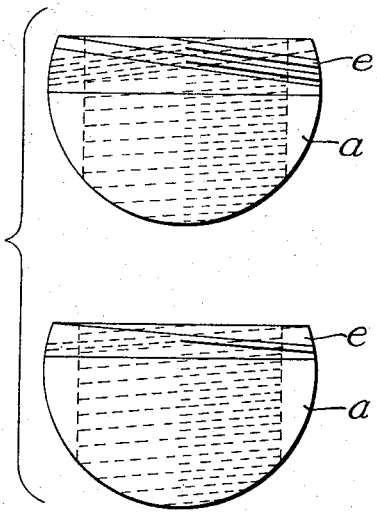

FIG. 10 illustrates four other collar nuts in end views similar to that of FIG. 9, the base threads being spaced differently from the collar band, the maximum thread spacing from the band being greater than the thickness of the mounting part, and the minimum thread spacing being less than that of the mounting part; and FIG. 11 shows end views of collar nuts according to the invention, one nut having a collar band provided with a screw thread angular to the base portion, and the other having a conical collar band providing different spacing between the base portion and the lower edge of the collar band.

Figure 1:
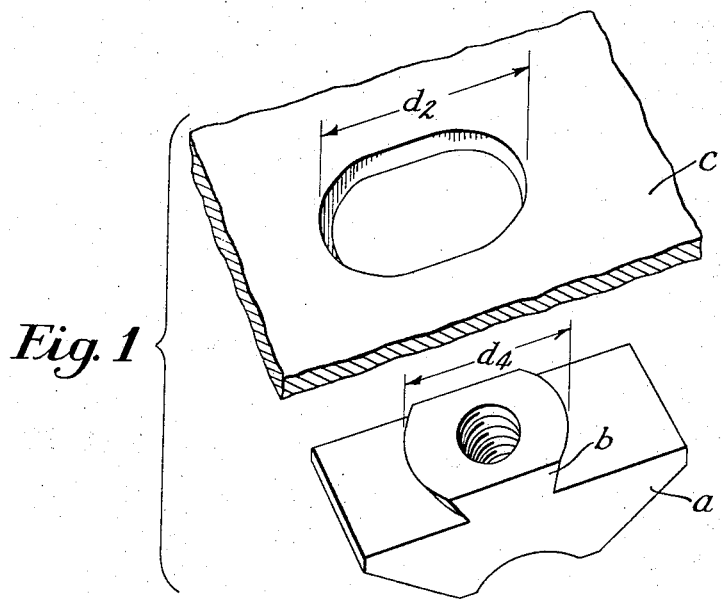
FIG. 1 is a perspective view of an undercut collar nut alined for insertion from one side of a work piece, the thickness of the latter corresponding to the height of the nut collar.
Figure 2:
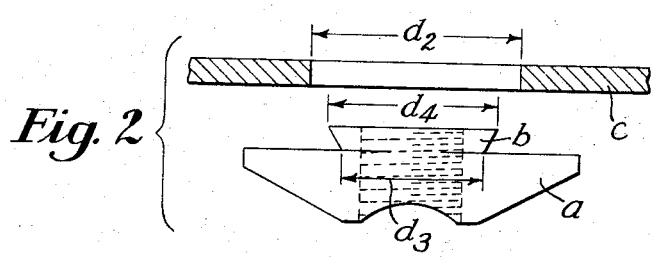
FIG. 2 is a view in side elevation of the nut and work piece of FIG. 1, dimensions being indicated.
Figure 3:
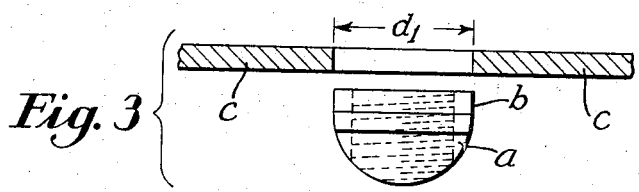
FIG. 3 is an end view of the nut and work piece of FIGS. 1 and 2.
Figure 5:
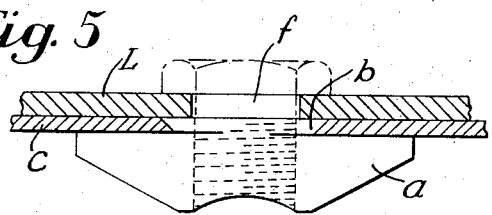
FIG. 5 is a view in side elevation of the nut of FIGS. 1–4, the collar having been inserted and rotated in the work piece bore 90° in readiness for receiving a bolt for coupling another part to the work piece.
Figure 6:
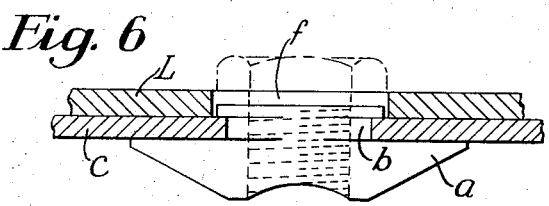
FIG. 6 is a view similar to FIG. 5 but showing the thickness of the nut collar greater than that of the work piece so that the other part shown in FIG. 5 must now have a larger bore.
Figure 7:
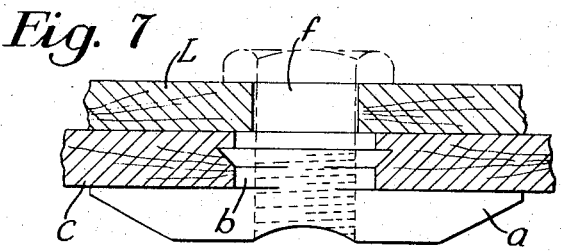
FIG. 7 is a view similar to that of FIG. 6 but showing a nut having a collar the thickness of which is less than that of the work piece.

Referring first to the collar nut of FIGS. 1–4 it comprises a base portion $a$ and an oblong, conical collar portion $b$ which is to be mounted in a work piece $c$. For the sake of illustration the thickness of the latter may be considered exaggerated in FIGS. 2, 3 and 5, and is formed with a non-circular or generally oblong collar receiving bore the minimum width of which is $d_1$ and the maximum length of which is $d_2$. The minimum width of the generally oblong collar is $d_3$ and is closer to the base portion $b$ than the maximum collar length represented by $d_4$. The collar accordingly is undercut and the nut preferably is internally threaded to receive a suitable stud or bolt, for instance as indicated in FIGS. 5–7. The height or thickness of the collar portion $b$ in FIGS. 1–5 is substantially equal to that of the work piece $c$. While the base portion $a$ is preferably also oblong, circular in cross section when viewed endwise as indicated in FIG. 3, and has its lengthwise extremities tapered or slabbed off vertically and angularly to require a lesser volume of metal than ordinary nuts (and to facilitate insertion through a work piece bore), the essential characteristic of the base $a$ is that its flat upper portion extend sufficiently lengthwise to span the work piece bore.

The mounting of the nut is effected in a collar-receiving bore which may be square, rectangular or generally oval, or simply an elongated hole with semi-circular ends. The following relations exist between the collar-receiving bore with unequal diameters and the novel thin-walled collar nut. The smallest bore diameter must be smaller than the largest diameter of the collar; the smallest diameter of the collar can be smaller or equal to the smallest bore diameter. If the longitudinal axis of the nut coincides with the longest diameter of the elongated bore, the boundary of the collar of the nut cannot extend beyond any line of the elongated bore. The elongated bore may have any length, and several collar nuts may be mounted in one and the same elongated bore if the length of the largest collar diameter is measured accordingly. Only the smallest diameter of the collar-receiving bore must be related to the collared nut, whereas the depth of the receiving bore and its length represent free limits which have no influence on the function of the nut.

Figure 4:
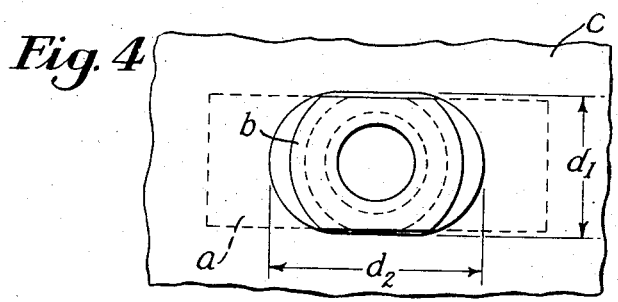
FIG. 4 is a plan view of the nut and work piece of FIGS. 1–3 showing size relations of the nut and receiving bore prior to insertion.

For mounting the collar nut in the work piece $c$ the collar portion $b$ is first alined with the work piece bore as shown in FIG. 4, moved axially into the bore until the base portion $a$ abuts the work piece, and then relatively turned about the axis substantially 90°. This assembles the nut and work piece $c$ as shown in FIG. 5, whereupon a part L may be coupled to the work piece by means of a bolt. Rotation of the undercut side walls of the collar portion $b$ by utilizing a suitable tool (or simple hand pliers if the nut is accessible) distends and/or cuts into and deforms the wall of the bore of the work piece thus to insure interlocking of the nut therewith. By reason of the rounded conical extremities of the collar portion $b$ the nut is usually readily turned into its secured position against frictional resistance afforded by the wall of the work piece bore. This wall thus accommodates the undercut surface of the collar portion $b$ and anchors it against movement in either axial direction. Holding power is not based on a press fit type of insertion.

In FIG. 6 the base portion $a$ of the nut remains unchanged but its oblong collar portion $b$, instead of having a sloping undercut surface, is provided with a thickness greater than the work piece $c$ and accordingly has a neck portion corresponding in thickness to that of the piece $c$ and an overhanging head or clamping collar portion which is accommodated in a bore $f$ of a part L. Operation of the nut is essentially the same as heretofore described.

Figure 8:
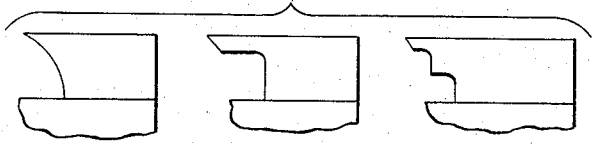
FIG. 8 shows three side views of portions of differently shaped collars with which collar nuts may be formed.

In FIG. 7 the nut has a modified collar shape adapted to cut into and become locked with a work piece $c$ of greater thickness than the collar $b$. As shown in FIG. 7 the oblong collar $b$ has a lower portion with vertical walls and an upper conical portion with outwardly and upwardly inclined walls (as in FIGS. 1–5). These inclined walls terminate in a flat top surface so that, after initial insertion, a portion of the top surface and the inclined walls become progressively embedded in the work piece $c$ during their rotation 90° about the axis. The collar walls of a nut may be formed with different shapes such as indicated in FIG. 8.

The collar nuts of FIGS. 9 and 10 correspond in general shape to that of FIGS. 1–5. The nut of FIG. 9 has an upper collar band $e$, and a base portion formed with an external thread, the maximum spacing of the thread from the band being greater than the thickness of the receiving work piece $c$, and minimum spacing of the thread from the band being less than the thickness of the work piece $c$. Accordingly, upon insertion and 90° rotation of the nut, it is drawn by its external threads axially into the work piece $c$ and the top of the collar band $e$ projects beyond the work piece $c$ to come even with another part (not shown) similar to the piece $c$ to be coupled thereto. Similarly, the collar nuts of FIG. 10 are adapted to accommodate differing thicknesses of work pieces $c$ to be anchored. The lower collar nut of FIG. 10, it may be noted, is a combination of the collar forms of FIGS. 1–5 and 7, and a nut base portion according to FIG. 9. Installation of the nuts of FIGS. 9 and 10 is facilitated by the axial play permitted in a receiving bore due to the enlarged radial dimensions of the nut base beneath the band $e$. During rotation of the nut this axial play diminishes until the work piece $c$ is clamped between the nut base and the nut collar band.

In FIG. 11 the upper collar nut has a thicker threaded collar band $e$. In the upper collar nut different spacings between the collar band and the base portion $a$ are produced by the pitch of the thread on the band; in the lower collar nut such spacings are produced by the conical form of the band $e$.

Having thus described my invention, what I claim as new and desire to secure by Letters Patent of the United States is:

1. A nut in combination with a carrier part having an elongated aperture therein, said nut having an internally threaded bore adapted for receiving a coupling member which is to extend through the aperture of said part, said nut comprising an elongated base having a flat surface of a lengthwise dimension sufficient for spanning the maximum dimension of said aperture and being formed with tapered lengthwise extremities, and a generally oblong collar coaxial with said bore and having its maximum lateral dimension extending in the same direction as the maximum lateral dimension of said base, the collar having a pair of opposed, substantially flat side portions being spaced apart a distance less than the minimum dimension of said aperture and having diagonal dimensions in a plane normal to the axis of said bore greater than the minimum dimension of said aperture to be spanned by the base, said collar being partially frusto-conical with its larger diameter more remote from the base and with its smaller diameter lying in the plane of said flat surface, the collar being axially insertable into said aperture whereby subsequent rotation of the nut to turn the collar in the aperture effects radial deformation by cutting into the part and providing locking engagement of the nut therein.

2. The combination of claim 1 wherein the collar has a band of a thickness which, when the collar has been fully extended through the aperture, lies beyond the general plane thereof, and a portion of said base adjacent said collar is externally formed with threads of an inclination opposite to that of said bore.

3. A nut for coupling to an apertured part and having an internally threaded bore adapted for receiving a coupling member which is to extend through the aperture of said part, said nut comprising an elongated base having a flat surface of a lengthwise dimension sufficient for spanning said aperture and being formed with tapered lengthwise extremities, and a generally oblong collar coaxial with said bore, the collar having diagonal dimensions in a plane normal to the axis of said bore greater than the minimum diameter of said aperture to be spanned by the base, said collar being partially frusto-conical and having its larger diameter more remote from the base, the collar being axially insertable into said aperture for subsequent rotation of the nut to turn the collar in the aperture to effect radial deformation by cutting into the part and providing locking engagement of the nut therein, said collar further having a band of thickness which, when the collar has been fully extended through the aperture, lies beyond the general plane thereof, and said base further having a portion adjacent said collar with a thread externally formed thereon of an inclination opposite to that of said bore.

References Cited

UNITED STATES PATENTS

| 1,774,799 | 9/1930 | Loudenslager | 85—32 |
| 2,019,049 | 10/1935 | Hoke | 151—41.73 |
| 2,172,827 | 9/1939 | Becker | 85—5 |
| 2,486,769 | 11/1949 | Watson | 151—41.73 |
| 3,187,424 | 6/1965 | Double et al. | 151—41.73 |

FOREIGN PATENTS

| 500,583 | 3/1954 | Canada. |
| 1,153,986 | 10/1957 | France. |

CARL W. TOMLIN, *Primary Examiner.*

R. S. BRITTS, G. A. MILWICK,
*Assistant Examiners.*